(12) United States Patent
Sawatani

(10) Patent No.: US 7,243,401 B2
(45) Date of Patent: Jul. 17, 2007

(54) CLIP

(75) Inventor: Seiji Sawatani, Kanagawa (JP)

(73) Assignee: Piolax, Inc., Yokohama-shi, Kangawa (JP)

( * ) Notice: Subject to any disclaimer, the term of this patent is extended or adjusted under 35 U.S.C. 154(b) by 70 days.

(21) Appl. No.: 10/802,941

(22) Filed: Mar. 18, 2004

(65) Prior Publication Data

US 2004/0181917 A1 Sep. 23, 2004

(30) Foreign Application Priority Data

Mar. 18, 2003 (JP) .......................... P. 2003-073318

(51) Int. Cl.
*E04F 19/02* (2006.01)
*F16B 13/06* (2006.01)
(52) U.S. Cl. .............................. 24/297; 411/41; 411/48
(58) Field of Classification Search .................. 24/289, 24/293–297; 411/41, 45–48, 340, 344, 453, 411/908, 508–510
See application file for complete search history.

(56) References Cited

U.S. PATENT DOCUMENTS

| 4,312,614 | A | * | 1/1982 | Palmer et al. ................. 411/44 |
| 5,028,187 | A | * | 7/1991 | Sato .............................. 411/48 |
| 5,689,863 | A | * | 11/1997 | Sinozaki ....................... 24/297 |
| 6,045,309 | A | * | 4/2000 | LeVey ........................... 411/45 |
| 6,074,144 | A | * | 6/2000 | Meyer ........................... 411/41 |
| 6,196,756 | B1 | * | 3/2001 | Leverger ....................... 411/45 |
| 6,511,273 | B2 | * | 1/2003 | Arisaka ......................... 411/48 |
| 6,533,515 | B2 | * | 3/2003 | Meyer ........................... 411/45 |
| 6,910,840 | B2 | * | 6/2005 | Anscher ........................ 411/41 |
| 2004/0247410 | A1 | * | 12/2004 | Anscher et al. ................ 411/45 |

FOREIGN PATENT DOCUMENTS

JP    2002-106519    4/2002

* cited by examiner

*Primary Examiner*—Robert J. Sandy
*Assistant Examiner*—Ruth C. Rodriguez
(74) *Attorney, Agent, or Firm*—McGinn IP Law Group, PLLC

(57) ABSTRACT

A clip includes an insertion member whose cross-sectional shape is in a T-shape, having a head portion and a shaft portion connected downwardly from the head portion; a latch member in a V-shape disposed on an outer side of the shaft portion; and a hinge member connecting the shaft portion and the latch member. Split flanges, mated in a flange-shape by surrounding the shaft portion when both side leg portions are closed, are provided to be continued from upper end portions of the both side leg portions. One side of an abutting surface of each split flange protrudes to form an L-shape in a plan view and abuts against a corresponding side portion of the shaft portion. A retaining protruding piece extending from a side portion opposite to a protruding portion and engaging with corresponding side portion of the shaft portion is formed on each both side leg portions.

15 Claims, 5 Drawing Sheets

CLIP

BACKGROUND OF THE INVENTION

1. Field of the Invention

The present invention relates to a clip in which an attaching hole formed in a unit to be attached is superposed on an attaching hole in an attaching unit, and the clip is inserted in these holes so as to connect the two units, thereby making it possible to fix them simply. The present invention especially relates to a clip in which an insertion member including a head portion and a shaft portion is connected to a latch member engaging on a reverse surface side of the attaching hole to be expanded in diameter by pressing the insertion member through hinge members, thereby permitting integral molding.

2. Description of the Related Art

As a conventional clip of this type, JP-A-2002-106519 discloses a clip which has an insertion member whose cross-sectional shape is formed substantially in a T-shape by a head portion and a shaft portion connected downwardly from the head portion; a substantially V-shaped latch member disposed on the outer side of the shaft portion; and hinge members connecting the shaft portion of the insertion member and the latch member, wherein as the head portion of the insertion member is pressed, the shaft portion presses both side leg portions of the latch member outwardly of the latch member to expand in diameter, subsequently, retaining pawls provided projectingly on both side leg portions of the latch member are engaged with retaining stepped portions formed in a bulged manner on a lower portion of the shaft portion of the insertion member, so that the state of the enlarged diameter of the latch member is held.

In addition, in the above-described clip, it is disclosed that flange portions which extend outwardly are respectively provided on upper portions of both side leg portions of the latch member, and the flange portions is formed in recessed shapes so as to hold the shaft portion in their interior and to abut against each other at outer portions. As concave and convex surfaces are formed at opposing edge portions which abut against each other, the mutual vertical relative offset or relative inclination of the both side leg portions is prevented.

Further, a clip having guide grooves which vertically extend and are formed in either one of the shaft portion of the insertion member and both side leg portions, and retaining protruding pieces which are formed on the other one of shaft portion of the insertion member and both side leg portions and are engageable with the guide grooves is disclosed. The guide groove is formed with such a length that the shaft portion is capable of moving between a corresponding position for holding a state of its reduced diameter and a corresponding position for holding a state of its enlarged diameter.

JP-A-2002-106519 is referred as a related art.

However, with the conventional clip disclosed in JP-A-2002-106519, if the clip is delivered as a product in a state that both side leg portions of the latch member are open, a user has to close both side leg portions and insert the clip into an attaching hole of a panel while maintaining the closed state at the time of attachment. Therefore, there has been a problem in that the operation becomes complicated.

It is conceivable to deliver the clip in a temporarily held state the closed state is maintained by the engagement between the concave and convex portions of the flange portions as well as the engagement between the retaining protruding pieces and the guide grooves are maintained. However, if the latch member is twisted through the flange portions and the like, the aforementioned engagement is easily canceled, so that there has been a problem in that the retained state cannot be maintained.

SUMMARY OF THE INVENTION

An object of the invention is provide a clip which enables to be supplied in a state that both side leg portions of the latch member are closed in which a insertion member and a latch member are integrated through hinge members.

The invention provides a clip including: an insertion member, whose cross-sectional shape is formed in a T-shape, having a head portion and a shaft portion connected downwardly from the head portion; a latch member, which is in a V-shape, disposed on an outer side of the shaft portion; and a hinge member connecting the shaft portion and the latch member, wherein as the head portion is pressed, the shaft portion presses both side leg portions of the latch member outwardly of the latch member to expand in diameter, and retaining pawls provided projectingly on the both side leg portions of the latch member are engaged with retaining stepped portions formed in a bulged manner on a lower portion of the shaft portion to hold a state in which the latch member expands in diameter, a pair of split flanges, which are mated in a shape of a flange by surrounding the shaft portion when the both side leg portions are closed, are provided to be continued from upper end portions of the both side leg portions of the latch member, one side of an abutting surface of each split flange protrudes to form an L-shape in a plan view and abuts against a corresponding side portion of the shaft portion, a retaining protruding piece, which extends from a side portion thereof opposite to a protruding portion of the split flange and engages with a corresponding side portion of the shaft portion, is formed on each of the both side leg portions, and as the retaining protruding piece is engaged with the shaft portion, the split flanges are mated to form a flange surrounding the shaft portion so as to hold the shaft portion.

According to the above-described invention, if the retaining protruding pieces formed on each of the both side leg portions are engaged with the corresponding sides of the shaft portion, the protruding side of the split flange formed on an upper end of each of the side leg portions abuts against the side portion of the shaft portion on the opposite side thereof. Accordingly, the shaft portion is tucked in by the retaining protruding piece of each side leg portion and the protruding side of the split flange and the retaining protruding piece engages with the shaft portion, so that the retaining protruding piece is difficult to disengage from the shaft portion. Thus, the both side leg portions can be reliably held in the closed state. For this reason, the product can be supplied stably in the temporarily held state that the both leg portions are closed. Incidentally, if an operator aligns the attaching hole of the attaching unit over the attaching hole formed in the unit to be attached, inserts the clip from its latch member side into these attaching holes, and further presses the head portion, the both side leg portions of the latch member can be expanded in diameter, and can be engaged with the reverse surface of the attaching hole on the coming-out side of the latch member, thereby making it possible to fix the two units.

Furthermore, stepped portions which are superposed on top of each other are respectively formed on abutting surfaces of the split flanges, one of the abutting surfaces, which protrudes toward the shaft portion, forms a stepped portion in which a lower side is a projection and an upper side is a recess, and another of the abutting surfaces, where the retaining protruding piece is formed, forms a stepped portion in which a lower side is a recess and an upper side is a projection.

According to the above-described invention, as for the one of the abutting surfaces, which protrudes toward the shaft portion, its lower projection enters the recess of the abutting surface of the other split flange, and its upper portion is pressed by the projection of the abutting surface. The retaining protruding piece extending from the other leg portion is disposed below the portion of the split flange protruding toward the shaft portion. Consequently, the projection of the abutting surface of the split flange on the side which protrudes toward the shaft portion is clamped from above and below by the projection of the abutment surface of the other split flange and the retaining protruding piece extending from the other leg portion. Thus, the state in which the abutting surfaces of the split flanges are mated is maintained, so that the split flanges are difficult to come off even if a twisting force or the like is applied from the outside.

Furthermore, a projection is formed on an inner side of each of the both side leg portions at a position lower than a portion where the hinge member is connected.

In accordance with the above-described invention, in the process of inserting the insertion member into the latch member, the projections and the hinge members are brought into contact with each other, and a situation is prevented in which the hinge members are bent in such a manner as to project downward. Therefore, at the time the clip is removed, the hinge members are pulled upward speedily together with the insertion member, so that both side leg portions can be closed reliably, thereby making it possible to remove the clip reliably.

DETAILED DESCRIPTION OF THE PREFERRED EMBODIMENTS

Embodiments of the invention will be explained with reference to the drawings.

Figure 1:
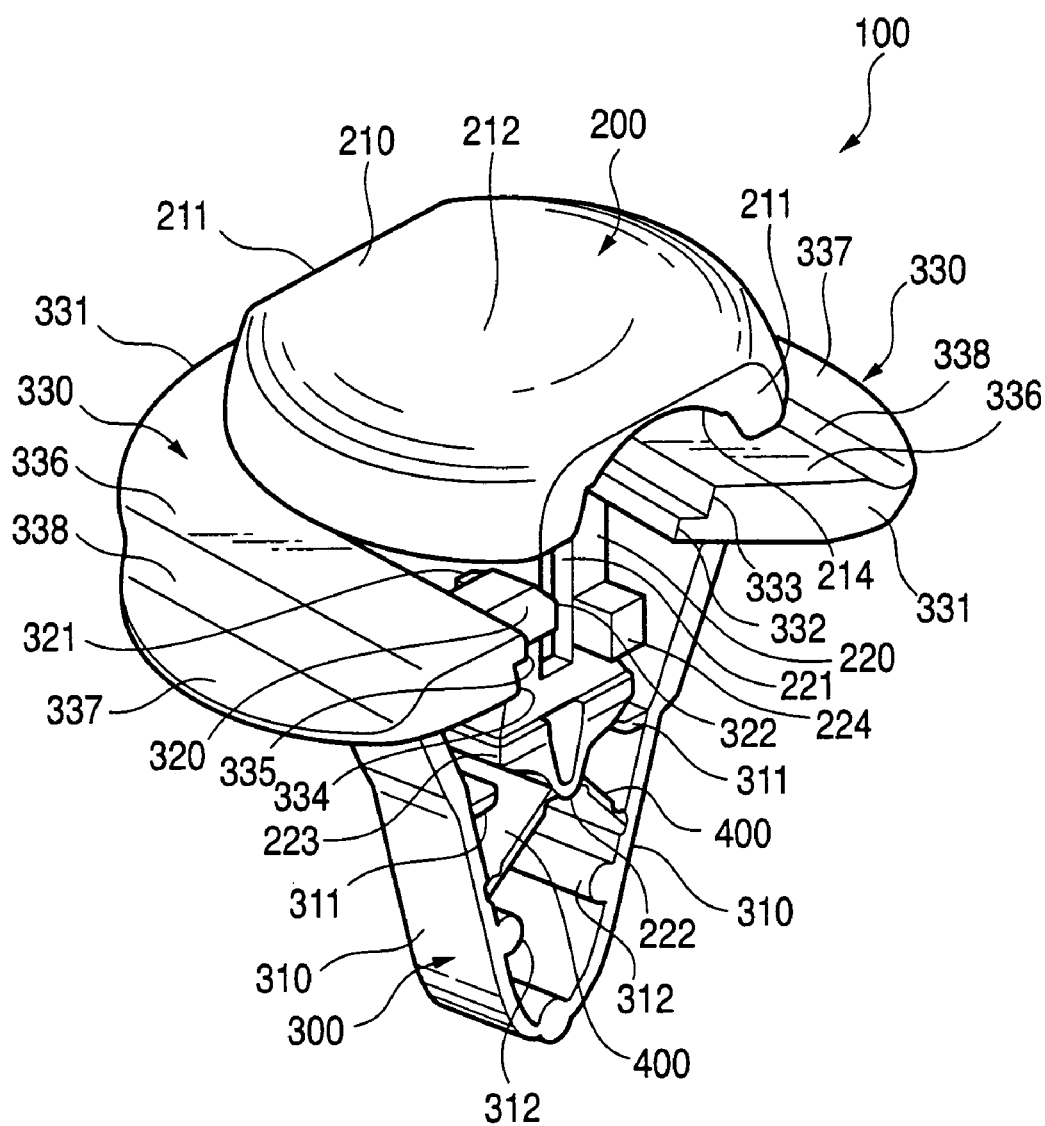
FIG. 1 is a perspective view of a state in which both side leg portions of the clip are open.
Figure 2:
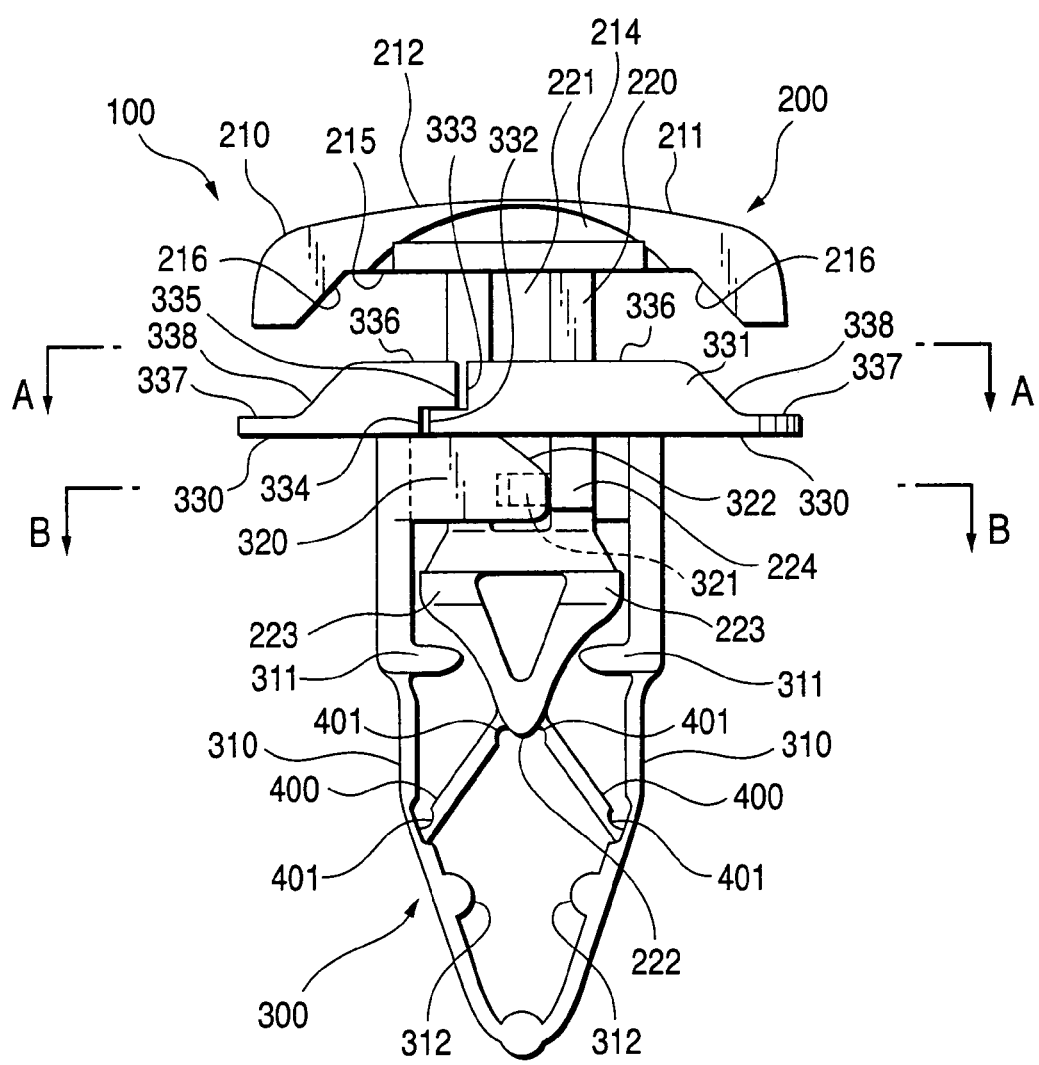
FIG. 2 is a side view of a state in which both side leg portions of the clip are closed.
Figure 3:
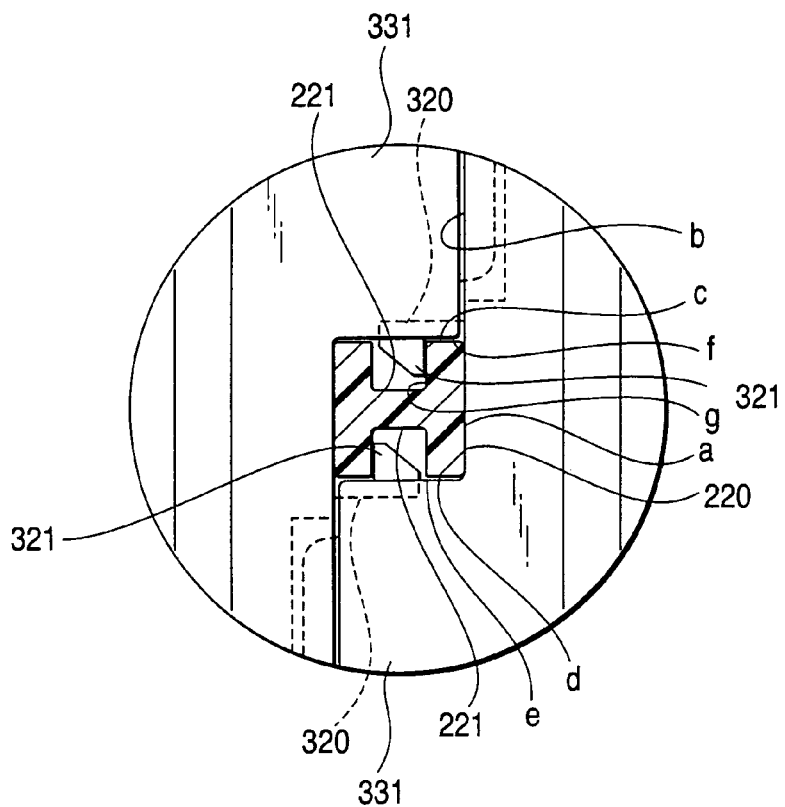
FIG. 3 is a cross-sectional view taken along line A—A in FIG. 2.
Figure 4:
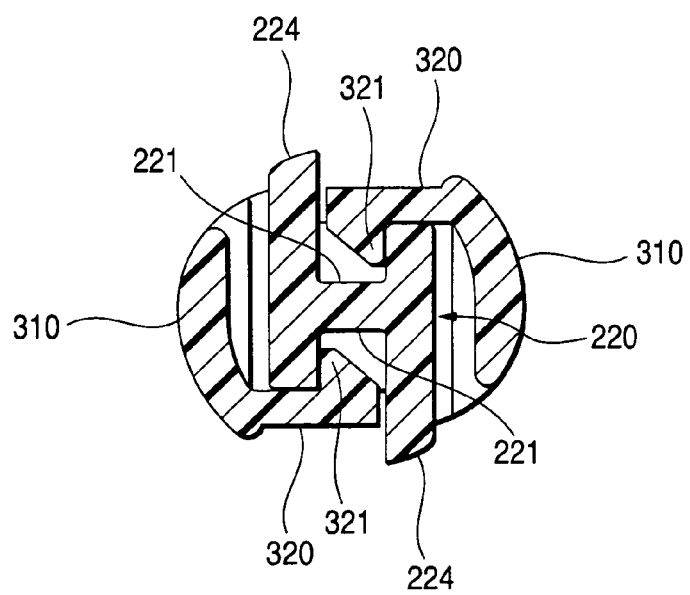
FIG. 4 is a cross-sectional view taken along line B—B in FIG. 2.
Figure 5:
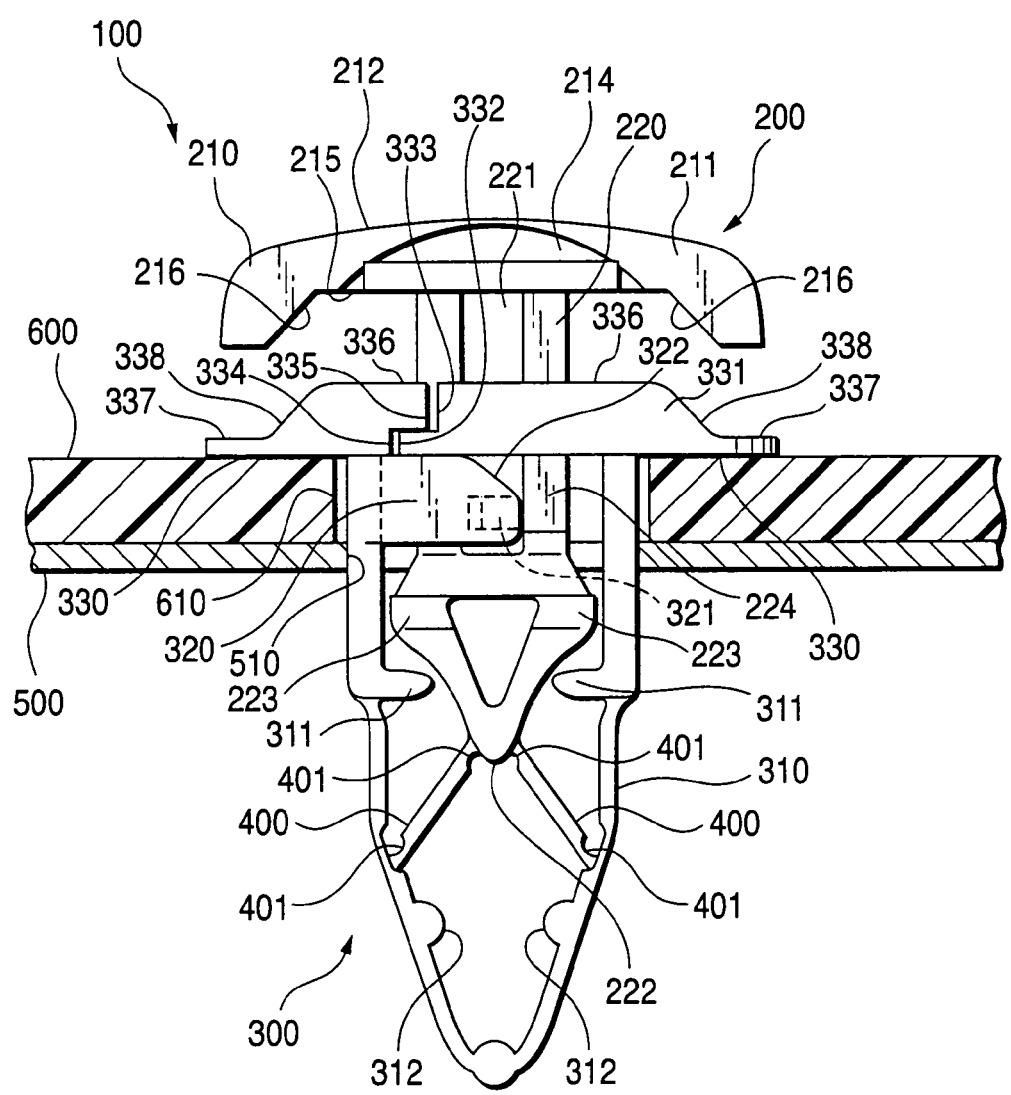
FIG. 5 is an explanatory view illustrating a state in which the clip is inserted in attaching holes of two plate members.
Figure 6:
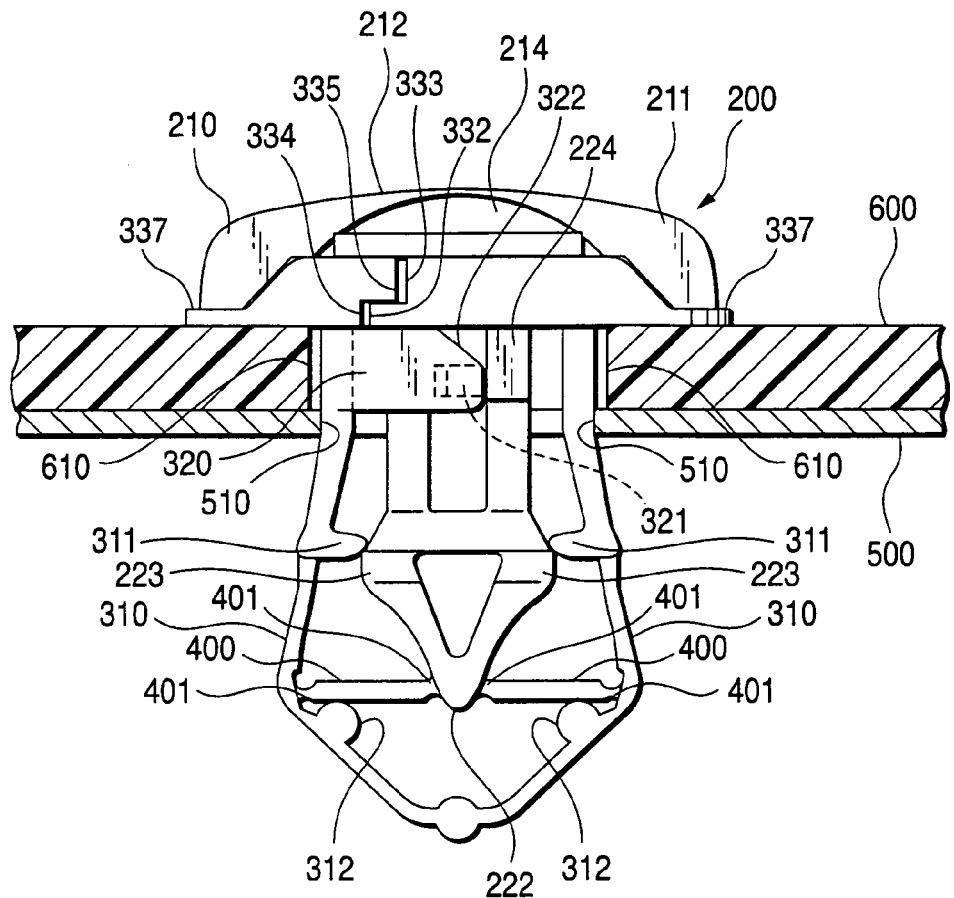
FIG. 6 is an explanatory view illustrating a state in which the two plate members are fixed by pressing in the head portion of the clip.

FIGS. 1 to 6 show an embodiment of a clip in accordance with the invention. FIG. 1 is a perspective view of a state in which both side leg portions of the clip are open. FIG. 2 is a side view of a state in which both side leg portions of the clip are closed. FIG. 3 is a cross-sectional view taken along line A—A in FIG. 2. FIG. 4 is a cross-sectional view taken along line B—B in FIG. 2. FIG. 5 is an explanatory view illustrating a state in which the clip is inserted in attaching holes of two plate members. FIG. 6 is an explanatory view illustrating a state in which the two plate members are fixed by pressing in the head portion of the clip.

As shown in FIGS. 1 and 2, a clip 100 has an insertion member 200 which includes a head portion 210 and a shaft portion 220 extending perpendicularly from the center of a lower surface of the head portion 210. Further, a latch member 300 in which both side leg portions 310 are connected in a V-shape is disposed on the outer side of the shaft portion 220 of this insertion member 200. The latch member 300 is connected to the shaft potion 220 by a pair of hinge members 400. Accordingly, in the clip 100, the insertion member 200 and the latch member 300 are connected through the hinge members 400, and can be integrally formed by injection molding.

The head portion 210 has a shape which is circular as a whole as seen from the top, and its circumferential opposing portions 211 are cut in parallel.

A tool inserting groove 214 gouged in a tapered shape is formed in a lower portion of each of the portions 211 cut in parallel. The clip 100 can be removed by inserting a tip of a flatblade screwdriver, for example, in this tool inserting groove 214 and by prying up the head portion 210.

As for the lower surface of the head portion 210, its central portion has the smallest thickness, and its peripheral edge has a gradually larger thickness, such that the lower surface of the head portion 210 forms a dish-shaped recessed portion 215 as a whole. The peripheral edge of this recessed portion 215 forms a tapered portion 216 since it has a gradually larger thickness, as described above.

Referring to FIGS. 3 and 4, the shaft portion 220 extending from the center of the lower surface of the head portion 210 is formed in the shape of a square pole whose cross section is substantially square. Engaging grooves 221 extending in the axial direction are respectively formed in its opposing side walls. A pawl portion 321 disposed in a tip of a retaining protruding piece 320 of the latch member 300, which will be described later, is adapted to be engaged in this engaging groove 221.

In the opposing side walls where the engaging grooves 221 are not formed, retaining stepped portions 223 swelling outwardly are formed at portions of the shaft portion 220 at positions slightly higher than a lower end 222 thereof. As shown in FIG. 2, the retaining stepped portion 223 has a chevron shape as viewed from the side, such that when the head portion 210 is pressed in to relatively lower the shaft portion 220 with respect to the latch member 300, the retaining stepped portions 223 are engaged with pawls 311 of the latch member 300 described later.

The engaging groove 221 is formed with a length allowing the shaft portion 220 to relatively move with respect to the latch member 300 until the retaining stepped portions 223 are engaged with the pawls 311 in a state that the pawl portions 321 of the retaining protruding pieces 320 are engaged with the engaging grooves 221.

Further, a guide projection 224 is formed on one side portion of the shaft portion 220 adjacent to the engaging groove 221, such that the guide projection 224 is located below split flanges 330, which will be described later, formed on upper ends of the both side leg portions 310 when the both side leg portions 310 of the latch member 300 are closed in a state that the head portion 210 is not be pressed in.

The guide projections 224 formed on the shaft portion 220 support lower surfaces of the split flanges 330 whose the pawl portions 321 engages with the shaft portion 220. Since the split flanges 330 are constrained, though loosely, with respect to the shaft portion 220 at two locations, their movement is restricted, and the attitude of the split flanges 330 is stabilized. Therefore, the operating efficiency at the time of inserting the clip into an attaching hole improves.

On the other hand, as shown in FIG. 2, the both side leg portions 310 of the latch member 300 have an upwardly open V-shape in a side view. The both side leg portions 310 are disposed on the outer side of the shaft portion 220, and are connected to the shaft portion 220 through the hinge members 400. Namely, one end of the hinge member 400 is connected to the lower end 222 of the shaft portion 220, and another end of the hinge member 400 is connected to the inner side of each of both side leg portions 310 slightly higher than a lower end of the V-shape. The hinge members 400 have thin-walled portions 401 formed at its connecting portions, and is made bendable at these thin-walled portions 401. In addition, when the shaft portion 220 is pushed in downwardly, the hinge members 400 act as links, and also serve to push the open both side leg portions 310 outwardly.

The pawl 311 which engages with the retaining stepped portion 223 of the shaft portion 220 is projectingly provided on an intermediate portion of the inner side of each side leg portion 310. When the shaft portion 220 is lowered by pushing in the head portion 210, the retaining stepped portions 223 of the shaft portion 220 move while pushing open the pawls 311, and the pawls 311 engages with upper portions of the retaining stepped portions 223 after the pawls 311 ride over the retaining stepped portions 223.

A rib-like projection 312 is formed on the inner side of each side leg portion 310 at a position lower than the portion where the hinge member 400 is connected. This projection 312 is provided so that the clip 100 can be removed smoothly.

Namely, when the clip 100 is removed, the insertion member 200 is first pulled out of the latch member 300. At that time, in a case where the pair of hinge members 400 connecting the both side leg portions 310 and the tip 222 of the shaft portion 220 are set substantially horizontally, as shown in FIG. 6, or at an upwardly projecting angle (in a case where the lower halves of both side leg portions 310 and the hinge members 400 are set in a substantially triangular shape in which they are outwardly swollen), when the insertion member 200 is pulled out, the hinge members 400 are easily moved away from the lower halves of the both side leg portions 310, and only the insertion member 200 moves in the pulling-out direction. Therefore, the both side leg portions 310 can close smoothly.

However, in a case where the pair of hinge members 400 connecting the both side leg portions 310 and the tip 222 of the shaft portion 220 are set at a downwardly projecting angle (in a case where the lower halves of both side leg portions 310 and the hinge members 400 are set in a substantially triangular shape in which they are inwardly depressed), when the insertion member 200 is pulled out, the hinge members 400 may fail to be moved away from the lower halves of both side leg portions 310, and may be moved in the pulling-out direction together with the insertion member 200. Also, the shape may be a triangular shape in which one side is inwardly depressed, a triangular shape in which another side is inwardly depressed, or a triangular shape in which both two sides are inwardly depressed. In such a case, since the both side leg portions 310 do not close smoothly, the clip 100 becomes a state that the clip is unremovable.

In the embodiment, since the projections 312 are present as described above, in the process where the insertion member 200 is inserted in the latch member 300, circular arc portion of the projection 312 and one surface of the hinge member 400 come into contact with each other, so that it is prevented from approaching each other. For this reason, the pair of hinge members 400 connecting the both side leg portions 310 and the tip 222 of the shaft portion 220 are prevented from forming at a downwardly projecting angle. The pair of hinge members 400 connecting the both side leg portions 310 and the tip 222 of the shaft portion 220 are in a substantially horizontal state as shown in FIG. 6, or at an upwardly projecting angle. Therefore, when the clip 100 is removed, the both side leg portions 310 can be closed reliably, thereby making it possible to obviate the inconvenience that the clip 100 fails to be removed.

As shown in FIGS. 2 and 4, the retaining protruding piece 320 extending in the axial direction from one side portion thereof is formed at each of the side leg portion 310 at a portion higher than the pawl 311. The pawl portion 321 which engages with the engaging groove 221 of the shaft portion 220 is formed at the tip portion of the retaining protruding piece 320. Further, as shown in FIGS. 1 and 5, an upper portion of the tip of the retaining protruding piece 320 is chamfered in a tapered shape. This tapered surface 322 functions to guide the split flanges 330 which will be described later. The projection 224 of the shaft portion 220 is formed on the side portion of the shaft portion 220 where the retaining protruding piece 320 does not abut with respect to the engaging groove 221.

The pair of split flanges 330, which are mated in the shape of a flange by surrounding the shaft portion 220 when both side leg portions 310 are closed, are provided to be continued from upper end portions of both side leg portions 310. Each of the split flanges 30 has a protruding portion 331 in which one side of its abutting surface protrudes in such a manner as to form an L-shape in a plan view. Further, when the pair of split flanges 330 are abutted, L-shaped inner side faces of each of the split flanges 330 abut against two intersecting surfaces of the shaft portion 220, surrounding the shaft portion 220. In this case, the inner side of the protruding portion 331 of each split flange 330 abuts against the surface of the shaft portion 220 where the engaging groove 221 is formed. In addition, the protruding portion 331 is formed on the side of both side leg portion 310 where the retaining protruding piece 320 is not formed.

In addition, stepped portions which are superposed on top of each other are respectively formed on the abutting surfaces of the split flanges 330 at the time when they are abutted. In this case, the abutting surface of the protruding portion 331 of each split flange 330 forms a stepped portion in which the lower side is a projection 332 and the upper side is a recess 333. On the other hand, the abutting surface of a side where each split flange 330 does not protrude (the side where the retaining protruding piece 320 of each side leg portion 310 is formed) forms a stepped portion in which the lower side is a recess 334 and the upper side is a projection 335.

As a result, when the pair of split flanges 330 are abutted, the projection 335 of the mating split flange 330 is disposed on top of the projection 332 of the abutting surface of the protruding portion 331, and the retaining protruding piece 320 extending from the mating leg portion 310 is disposed therebelow. For this reason, when the pair of slip flanges 330 are abutted, the projection 332 of the abutting surface of the protruding portion 331 is clamped from above and below by the projection 335 of the mating split flange 330 and the retaining protruding piece 320 extending from the mating leg portion 310. Thus, the state in which the abutting surfaces of the split flanges 330 are mated is maintained, so that the split flanges 330 are difficult to come off even if a twisting force or the like is applied from the outside.

As for the split flanges 330, although their lower surfaces are flat, their upper surfaces rise such that the abutting surface (split surface) side is made thick and the end portion side away from the abutting surface is made thin. The portion between a thick-walled portion 336 and a thin-walled portion 337 is formed as a tapered portion 338 which gradually protrudes. Further, the thick-walled portion 336 conforms to the recessed portion 215 of the head portion 210. The tapered portion 338 conforms to the tapered portion 216 of the head portion 200. For this reason, when the head portion 210 is pressed, the thick-walled portions 336 of the abutted split flanges 330 enter the recessed portion 215 of the head portion 210 and are brought into close contact therewith. Thus, since the split flanges 330 can be held in an integral state, as compared with the clip of a type in which the latch member 300 is not split, the strength as the clip after its attachment becomes equal.

Next, a description will be given of the method of using the clip 100.

As for the clip 100, at the time of its factory shipment, its both side leg portions 310 are closed, and the pawl portions 321 of the retaining protruding pieces 320 of both side leg portions 310 are respectively engaged with the engaging grooves 221 of the shaft portion 220. As a result, the clip 100 is held in the state that the both side leg portions 310 are closed, as shown in FIG. 2.

At this time, as shown in FIG. 3, the protruding portion 331 of the split flange 330 of each both side leg portion 310 abuts against one surface of the shaft portion 220 where the engaging groove 221 is formed, while the retaining protruding piece 320 of that leg portion 310 abuts against the other surface of the shaft portion 220 where the engaging groove 221 is formed. Therefore, the shaft portion 220 is held by being tucked in a U-shape, making the retaining protruding piece 320 difficult to disengage from the engaging groove 221.

In addition, when the both side leg portions 310 are closed, the protruding portions 331 of each of the split flanges 330 are fitted over the upper portions of the retaining protruding pieces 320 while being guided by the projections 224 of the shaft portion 220 and the tapered surfaces 322 of the retaining protruding pieces 320 of the leg portions 310. Further, in the state that the both side leg portions 310 are closed, the pair of split flanges 330 are abutted and form a circular flange shape as a whole in a plan view, as shown in FIG. 2. In addition, as described above, since the projection 332 of the abutting surface of the protruding portion 331 in each split flange 330 is clamped from above and below by the projection 335 of the mating split flange 330 and the retaining protruding piece 320 extending from the mating leg portion 310, the split flanges 330 are difficult to come off even if a twisting force or the like is applied from the outside.

As shown in FIG. 5, an operator aligns an attaching hole 610 of a plate member 600 serving as an attaching unit over an attaching hole 510 of a plate member 500 serving as a unit to be attached. The operator consecutively inserts the clip 100 into the attaching holes 610 and 510 in sequence from the side of its both side leg portions 310. As a result, the lower surfaces of the split flanges 330 abutted against each other abut against the upper surface of the plate member 600.

In this state, as shown in FIG. 6, if the head portion is pressed downward, the shaft portion 220 is lowered, and the retaining stepped portions 223 formed on the shaft portion 220 in a bulged manner abut against the pawls 311, thereby spreading out the both side leg portions 310. At this time, the hinge members 400 act as links to contribute to the spreading out of the both side leg portions 310. Since the pawl portions 321 of the retaining protruding pieces 320 move upwardly along the engaging grooves 221, the lowering of the shaft portion 220 is not prevented.

Then, when the pawls 311 ride over the retaining stepped portions 223 and move above them, the proximal side of the both side leg portions 310 is engaged with the reverse surface side of the attaching hole 510 of the plate member 500 which is the unit to be attached. The pawls 311 are then engaged with upper portions of the retaining stepped portions 223 by the inwardly pressing force as the proximal side of the both side leg portions 310 is brought into pressure contact with the attaching hole 510. Thus, a state of enlarged diameter is maintained for the both side leg portions 310, and the both side leg portions 310 with the enlarged diameter are engaged with the peripheral edge of the attaching hole 510 on the reverse surface, thereby making it possible to fix together the plate member 500 and the plate member 600.

In this fixed state, the thick-walled portions 336 of the split flanges 330 enter the recessed portion 215 of the head portion 210, and are brought into close contact therewith. As a result, the positional offset between the head portion 210 and the split flanges 330 is prevented.

When the clip 100 is removed, it can be removed by inserting a tool such as a flatblade screwdriver in the tool inserting groove 214 and by prying up the head portion 210.

In the invention, the pair of split flanges 330 may be formed in an angular shape, such as a square shape or a rectangular shape, as a whole in a plan view when they are abutted. Similarly, the head portion 210 may also be formed in an angular shape, such as a square shape or a rectangular shape, as a whole in a plan view.

Furthermore, although a cross-sectional shape of the shaft portion 220 in this embodiment is formed in a square shape as a whole, the cross-sectional shape may be formed in another shape. For example, the shaft portion 220 may be formed in a rectangular shape whose surface where the engaging groove 221 is formed is shorter.

As shown in FIG. 3, in the clip in accordance with the invention, one side (a) of the shaft portion 220 of the insertion member 200 is abutted against one side (b) of the split flange 330. Further, two sides (c, d) making up ends of the one side (a) are constrained with a gap by another side (e) perpendicular to the one side (b) of the split flange and by one side (f) of the retaining protruding piece 320. Furthermore, one side (g) parallel to the abutting side (b) and making up the groove is constrained with a gap by the pawl portion 321. Since the insertion member 200 enables to slide with respect to the latch member 300, a gap necessary for sliding is essential between the insertion member 200 and the latch member 300, so that play between the insertion member 200 and the latch member 300 cannot be eliminated. However, it is possible to narrow the range of rotational angle based on the play by making the one side (a) of the shaft portion 220 long.

On the other hand, if the play between the insertion member 200 and the latch member 300 is large, there is a possibility that apprehensions whether the fixing function as the clip can be obtained sufficiently. Accordingly, if the cross-sectional shape of the shaft portion 220 is formed in a rectangular shape in which the surface where the engaging groove 221 is formed is shorter, even if the operator twits the clip, since the insertion member 200 has a small angle of rotation with respect to the latch member 330, the play of the clip as a whole is small. Therefore, the apprehensions over the aforementioned function are eradicated, and the operator's reliability on the clip is enhanced, so that the value as a commercial product increases.

Further, it is possible to adopt a structure in which the engaging grooves 221 are not provided by causing the pawl portions 321 of the retaining protruding pieces 320 to engage corners of the shaft portion 220.

Figure 7:
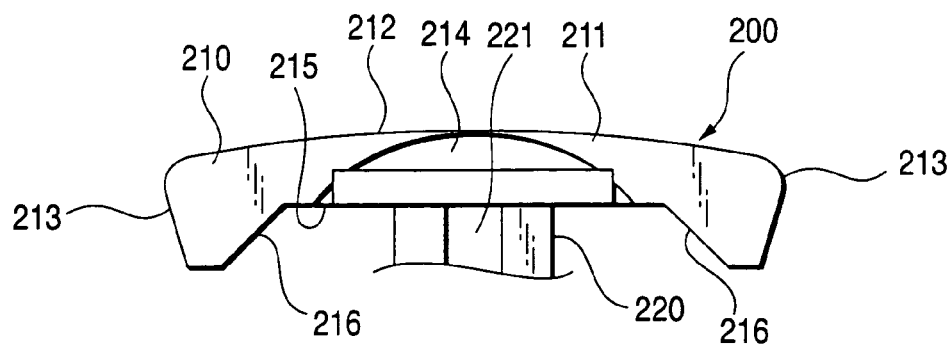
FIG. 7 is a partially enlarged side view illustrating the head portion of a clip in accordance with another embodiment of the invention.

FIG. 7 shows another embodiment of the invention. In this embodiment, the shape of the head potion 210 is different from that of the above-described embodiment. Namely, the head portion 210 has a circular shape as a whole as viewed from the top, and has a shape in which its peripheral opposing portions 211 are cut in parallel. Its upper surface 212 as viewed from the side has a gently convex surface which is upwardly convex, and a side surface 213 of its circular arc-shaped portion has an inversely tapered shape whose upper side has an enlarged diameter and whose lower side has a reduced diameter. For this reason, by pinching the pair of opposing side surfaces 213 with fingers, the head portion 210 can be easily pinched when it is pulled up to remove the clip 100.

As described above, in accordance with the above embodiments, if the retaining protruding pieces 320 formed on each of the both side leg portions 310 are engaged with the corresponding sides of the shaft portion 220, the protruding side of the split flange 330 formed on an upper end of each of the side leg portions 310 abuts against the side portion of the shaft portion 220 on the opposite side thereof. Accordingly, the shaft portion 220 is tucked in by the retaining protruding piece 320 of each side leg portion 310 and the protruding side of the split flange 330, so that the retaining protruding piece 320 is difficult to disengage from the shaft portion 220. Thus, the both side leg portions 310 can be reliably held in the closed state. For this reason, the product can be supplied stably in the temporarily held state that the both leg portions 310 are closed.

What is claimed is:

1. A clip comprising:
an insertion member coynprisina a T-shape cross-section and having a head portion and a shaft portion connected downwardly from the head portion;
a latch member comprising a V-shape, disposed on an outer side of the shaft portion;
a hinge member connecting the shaft portion and the latch member; and
at least one engaging groove formed in a side wall of the shaft portion,
wherein as the head portion is pressed, the shaft portion presses side leg portions of the latch member outwardly of the latch member to expand in diameter, and retaining pawls provided projectingly on the side leg portions of the latch member are engaged with retaining stepped portions formed in a bulged manner on a lower portion of the shaft portion to hold a state in which the latch member expands in diameter,
wherein a pair of split flanges, which are mated in a shape of a flange by surrounding the shaft portion when the side leg portions are closed, are provided to be continued from upper end portions of the side leg portions of the latch member,
wherein one side of an abutting surface of the pair of split flanges protrudes to form an L-shape in a plan view and abuts against a corresponding side portion of the shaft portion,
wherein a retaining protruding piece, which extends from a side portion thereof opposite to a protruding portion of the split flange, is formed on the side leg portions, said retaining protruding piece comprising a pawl portion extending from an end of said retaining protruding piece, said pawl portion engaging a side portion of said shaft portion,
wherein as the retaining protruding piece is engaged with the shaft portion, the split flanges are mated to form a flange surrounding the shaft portion so as to hold the shaft portion, and
wherein said pawl portion engages a surface of said engaging groove.

2. The clip according to claim 1,
wherein second stepped portions which arc superposed on top of each other are respectively formed on second abutting surfaces of the split flanges,
wherein one of the abutting surfaces, which protrudes toward the shaft portion, forms a stepped portion in which a lower side is a projection and an upper side is a recess, and
wherein another of the abutting surfaces, where the retaining protruding piece is formed, forms a stepped portion in which a lower side is a recess and an upper side is a projection.

3. The clip according to claim 2, wherein a projection is formed on an inner side of the side leg portions at a position lower than a position where the hinge member is connected.

4. The clip according to claim 1, wherein a projection is formed on an inner side of the side leg portions at a position lower than a position where the hinge member is connected.

5. The clip according to claim 1, further comprising a tool groove formed in a cut-out portion of the head portion.

6. The clip according to claim 1, wherein the head portion comprises a peripheral edge having a tapered portion that gradually increases in thickness from a center of the head portion towards the peripheral edge of the head portion.

7. The clip according to claim 1, further comprising a guide projection formed on a side of the shaft adjacent the engaging groove.

8. The clip according to claim 1, wherein an upper portion of a tip of the retaining protruding portion comprises a tapered shape.

9. The clip according to claim 1, wherein an upper surface of the split flange comprises a lower portion and an upper portion, and
wherein a thickness of the upper portion is greater than a thickness of the lower portion of the upper surface.

10. The clip according to claim 9, wherein the upper surface of the split flange further comprises a gradually protruding tapered portion between the lower portion of the upper surface and the upper portion.

11. The clip according to claim 10, wherein the upper portion conforms to a recessed portion of the head portion and the tapered portion of the split flange conforms to a tapered portion of the head portion.

12. The clip according to claim 1, wherein a gap is formed between the insertion member and the latch member, and
wherein said gap is sufficient to enable the insertion member to slide with respect to the latch member.

13. The clip according to claim 1, wherein said shaft portion comprises a substantially rectangular shape.

14. The clip according to claim 1, wherein said head portion comprises an arc-shaped peripheral edge portion having an inversely-tapered shape and having an upper side and a lower side, and
wherein a diameter of the upper side is larger than a diameter of the lower side.

15. The clip according to claim 1, wherein said hinge is disposed along an inner side wall portion of said latch member.

* * * * *